US005762552A

United States Patent [19]

Vuong et al.

[11] Patent Number: 5,762,552

[45] Date of Patent: Jun. 9, 1998

[54] INTERACTIVE REAL-TIME NETWORK GAMING SYSTEM

[75] Inventors: Son Thanh Vuong, Vancouver, Canada; Xuyen Thanh Vuong, Vienna, Va.; Binh Thanh Vuong, Simi Valley, Calif.; Phu Thanh Vuong, Simi Valley, Calif.; Vinh Thanh Vuong, Simi Valley, Calif.

[73] Assignee: VT Tech Corp., Simi Valley, Calif.

[21] Appl. No.: 567,776

[22] Filed: Dec. 5, 1995

[51] Int. Cl.$^{6}$ .............. G06F 15/28

[52] U.S. Cl. .............. 463/25; 463/17; 463/29; 463/42

[58] Field of Search .............. 463/40, 42, 16, 463/17, 22, 11, 34, 29, 25; 273/142 E, 142 R; 364/412

[56] References Cited

U.S. PATENT DOCUMENTS

| | | | |
|---|---|---|---|
| 3,810,627 | 5/1974 | Levy | 463/42 |
| 4,339,798 | 7/1982 | Hedges et al. | 463/31 |
| 4,614,342 | 9/1986 | Takashima | 273/85 |
| 4,875,164 | 10/1989 | Monfort | 364/412 |
| 4,926,327 | 5/1990 | Sidley | 463/42 |
| 5,249,800 | 10/1993 | Hilgendorf et al. | 273/138 A |
| 5,342,047 | 8/1994 | Heidel et al. | 273/85 CP |
| 5,361,091 | 11/1994 | Hoarty et al. | 348/7 |
| 5,377,997 | 1/1995 | Wilden et al. | 273/434 |
| 5,411,258 | 5/1995 | Wilson et al. | 273/86 |
| 5,588,650 | 12/1996 | Eman et al. | 463/17 |

OTHER PUBLICATIONS

Bulkeley, William M; Electronics Is Bringing Gambling Into Homes, Restaruants and Planes; Wednesday, Aug. 16, 1995; pp. A1 and A5; *The Wall Street Journal.*

*Primary Examiner*—Jessica Harrison
*Assistant Examiner*—James Schaaf
*Attorney, Agent, or Firm*—Craig E. Shinners

[57] ABSTRACT

The present invention is related to a network based gaming system that enables a plurality of players to place wagers on a real-time game of chance being conducted in a casino via a distributed network system or, alternatively, to place wagers on a game of chance using internally generated game sequences.

In the preferred embodiment of the system, a gaming machine provides a menu of a plurality of live-action board games of chance, such as roulette, craps or baccarat, from which a player selects a desired game. Once the game is selected, the player is presented a video representation of the possible bets on the gaming machine and a means for establishing a stake by either depositing currency or by accessing various credit accounts such as a credit card or casino credit line. After the player's bets are placed and recorded in memory resident in the gaming machine, the video representation displayed on the gaming machine is adapted to include a broadcast quality feed comprising, both audio and video signals from the selected gaming table in the casino. The transmission network and the gaming machines are coupled to a network manager which is responsible for maintaining network integrity and for providing memory capacity of the recording of bets placed by gaming machines locate outside the controlled environment of the casino. The result of the next-to-occur play of the selected game of chance is detected and transmitted to the remote gaming machines over the transmission network. The results are compared with the bets placed by the player at each of the gaming machines to determine if the player wins or loses the bets. The won/loss determination is also transmitted to the remote gaming machines by the network manager. If the bets placed by the player are determined to be winners, the appropriate winnings are calculated and returning to the player either in currency or credited to the appropriate account maintained at the network manager. If the bets placed by the player are not winning bets, deposited currency is retained by the gaming machine or, if the bets are placed using a credit account, the appropriate deductions are made from the account.

16 Claims, 11 Drawing Sheets

GT : Gaming Table
GM: Gaming Machine

GT : Gaming Table
GM: Gaming Machine

Notation:

| | |
|---|---|
| +: | Reception |
| -: | Transmission |
| P.x: | Service primitive x exchanged with the player |
| <Proc>: | Some procedure (sequence of interactions) "Proc" |
| [T1]: | Timeout T1 seconds |

Notation:

| | |
|---|---|
| +: | Reception |
| -: | Transmission |
| P.x: | Service primitive x exchanged with the player |
| <Proc>: | Some procedure (sequence of interactions) "Proc" |
| [T1]: | Timeout T1 seconds |

Notation:

| | |
|---|---|
| +: | Reception |
| -: | Transmission |
| P.x: | Service primitive x exchanged with the player |

| 1B SD 150 | 2B CID 152 | 2B SID 154 | 1B TYPE 156 | 3B TYPE PARAM 158 | (0 ... L)B DATA 160 | 2B CRC 162 | 1B ED 164 |
|---|---|---|---|---|---|---|---|

SD: Start Delimiter (01111110)

CID: Client ID

SID: Server ID

TYPE:
- CR Connect Request
- CC Connect Confirm
- DR Disconnect Request
- DC Disconnect Confirm
- SB Stop Bet, i.e. No More Bet
- GR Game Result
- Data For transferring optional video and audio informations

TYPE PARAM: This field is set to 0's except for the following types of frames:
- DC (issued by Server) where it contains Server Status Information such as betting limits (2 bytes)
- DR (issued by Server) where it contains reason for disconnection (2 bytes)
- GR (issued by Server) where it contains the game result, e.g. a winning number (1 byte)
- Data where it contains an optional data length of the data field

DATA (0...L) Bytes: Contains from 0 up to a maximum of L bytes of video and audio informations

CRC: Cyclic Redundancy Code

ED: End Delimiter (01111110)

FIGURE 10

INTERACTIVE REAL-TIME NETWORK GAMING SYSTEM

BACKGROUND OF THE INVENTION

The present invention relates to networked gaming systems. More particularly, the present invention relates to a network based gaming system that enables a plurality of remote players to place wagers on a real-time game of chance conducted in a casino via a distributed network system.

In a casino it is common to see row after row of video gaming machines such as video poker and blackjack as well as electronic slot machines. At any given time it is probable that the majority of players within the casino are playing one of the video gaming machines rather than one of the traditional board games such as roulette, craps or baccarat. One reason for the popularity of the video gaming machines with the casinos arises because players are able to play a selected game of chance unattended by a casino employee.

Further, a significant number of casino visitors will play a game of chance at a video gaming machine because of familiarity with video games in general and because there is less pressure to play at the rate of play determined by other players at the board games. Since the video player can determine how often the plays are initiated, it is possible for such players to determine the correctness of the payout from the previous play or to leisurely determine their desired bets and the amount of the wagers before initiating the next play of the game with no pressure from other players or casino employees. It is also possible for such video gaming machines to provide instructional games so that the user can learn how to place various bets thereby increasing the number of players willing to place monetary wagers on bets in a casino.

Another reason that casino board games are not apparently as popular as video card games or slot machines is that the number of seats or positions at each board game is limited by the traditional design of the game table. For example, at a typical roulette table, the casino must provide a roulette wheel and a bet board designating the possible bets. Each player must be able to gain access to the bet board and place a wager by positioning one or more chips or casino tokens on the portion of the bet board corresponding to the desired bet. Thus, the number of players is further constrained by the physical limitations of the average player's reach when attempting to place their chips on the bet or bets. The number of players at a particular table is further yet constrained by the ability of a casino employee (the "gaming employee") to monitor the placing of the various bets, to initiate the start of each play of the game, to declare the winning number, to collect all losing wagers and to pay all winning wagers in a timely manner.

For a game such as craps, additional gaming employees are required to monitor the proceedings, to ensure losing wagers are collected and winning wagers are properly paid. In many casinos, up to three employees are required to operate a single craps game. As with roulette, the number of players that may participate in a particular game of craps is limited by the size of the table and the ability of the players to place a wager on a desired bet in a timely manner. The casino is unable to increase the number of players (and correspondingly the profits of such a table) that are attended to by the gaming employees. As the number of players increase, the casino must provide more tables. However, in most casinos the number of tables is limited by the floor space allocated to such board games and by the number of gaming employees available at any particular time to operate the additional tables. Thus, the casino may be unable to quickly respond to an increase in the number of players desiring to play a particular board game and may lose significant revenue if these players do not have an opportunity to play.

With the advent of the Internet and the general acceptance of gambling throughout the United States and the world, it has been reported in the general press that it will soon be possible to place a wager on games of chance via the personal computer. Such "on-line" gambling, requires a server, typically a computer capable of establishing communications with the player's personal computer, to generate a series of random outcomes of the particular game of chance and to maintain an account of winnings. However, there are problems with on-line gambling. For example, the credibility of the provider of the game of chance is often not well known to the public. Moreover, players are often concerned that the outcome of each play of a game of chance is not randomly generated. Another problem is that players are often unsure as to whether winning wagers will be correctly reported and promptly paid. It is desirable that the player have a high degree of confidence that the outcome of each play of the selected game of chance is fair and that winning wagers will be paid.

It would be highly desirable to provide a system that provides access to one of a plurality of board games offered by a casino to a nearly unlimited number of players without a corresponding increase in the number of gaming employees required to operate or to attend to the many tasks required by the play of a particular game of chance. It is further desirable that the players have a high degree of confidence that the outcome of each play of the selected game of chance is fair and that winning wagers will be promptly paid.

In addition to the above, it is desirable to provide a system where a player could simultaneously participate in more than one game of chance so as to farther increase casino revenue.

SUMMARY OF THE INVENTION

The present invention relates to a network based gaming, system that provides an interactive real-time game of chance via a distributed network system comprising a network manager, at least one gaming table and a plurality of gaming machines coupled together by a transmission network. In one preferred embodiment of the system, the player establishes a stake by either depositing currency or accessing various credit accounts such as a credit card or casino credit line and the gaming machine provides a menu of several live-action board games of chance, such as roulette, craps or baccarat, from which a player selects a desired game. Once the game is selected, the gaming machine presents a video representation of the available bets on a display associated with the gaming machine from which the player may select one or more bets and corresponding wager amounts. The stake is accessed when the player desires to place the wagers.

In one preferred embodiment, the gaming machine connects to the gaming tables over the transmission network. If gaming machines are deployed in private or remote locations such as in a hotel room or from another remote site outside direct control of the casino, connection to the transmission network is made through the network manager. With the remotely deployed gaming machines, the player establishes the stake by accessing various credit accounts such as a credit card or casino credit line since it would be impractical to collect currency from widely dispersed locations. In this instance, the player's stake is established and maintained by the network manager. Also, for security reasons and to minimize network communications, the determination of whether the wager is a winning or a losing wager is determined by the network manager which then transmits the determination to the remote gaming machine.

Prior to the initiation of a play of the selected game of chance, the player transmits a list corresponding to the selected bets and the corresponding wager amount (the "wager information") to the network manager. Once the network manager receives the wager information, the player is queued for the next to occur play of the selected game of chance.

In another preferred embodiment, the gaming machine operates substantially in a stand-alone configuration and is preferably deployed in a controlled environment such as on the floor of a casino where the likelihood of tampering is slight. Each such gaming machine is capable of: establishing a player's stake by accepting currency or credit information; interfacing with the gaming table to determine the outcome of the game of chance over the network; determining whether bets placed by the remote player correspond to winning or losing bets; and making appropriate payments for wagers placed on winning bets. The necessity to interface with a network manager is limited to the transfer of accounting information or to maintain the network protocol.

After the player's wagers are placed on the desired bets, the video representation displayed on the gaming machine is adapted to include a broadcast quality feed comprising both audio and video signals from the selected gaming table in the casino. The feed is transmitted to the gaming machine over the transmission network. The transmission network also provides the communication link between the gaming tables, the gaming machine and the network manager. The result of the next to occur play of the selected game of chance is detected by electronic, optical or manual detection means and transmitted over the transmission network to the network manager and the gaming If the player is playing at a remote site, the result of each play of the game of chance is compared by the network manager with the bets placed by the player to determine if the player wins or loses those bets. The network manager then transmits the won/loss determination to the remote gaming machine. If, however, the player is playing at a gaming machine on the casino floor, the won/loss determination may be made by the gaming machine independent of the network manager. If the bet placed by the player is determined to be a winner, the appropriate winnings are calculated and returned to the player either in currency or credited to the appropriate account corresponding to the player's stake. If the bets placed by the player are not winning bets, the currency deposited by the player is retained by the gaming machine. If the bets are placed using a credit account and the results are a draw, the wager amount is added to the player's stake by updating the appropriate account. The gaming process is repeated as frequently as the player wishes to play. At selected periods, the player may return to the menu and select a different or additional game of chance or exit the system.

In another preferred embodiment, the system comprises a plurality of gaming tables coupled to a network manager by a transmission network and a plurality of gaming machines, each of which comprises an interactive television system or multimedia computer system. The gaming machines are coupled to the network manager by a cable, satellite or other direct broadcast transmission system. Due to the possiblity that these gaming machines are remotely located, the stake is setup using credit lines and maintained at the network manager.

In yet another preferred embodiment, each gaming machine may be used as a stand-alone system for practice or demonstrations. In yet another preferred embodiment, a plurality of gaming machines are connected to the network manager and adapted such that a player at one of the gaming machines may play against players at other gaming machines. In this embodiment, one of the gaming machines connected to the network is designated as the game server, that is, as the source of the outcome of each play of the selected game of chance rather than the broadcast of a live action gaming table. After the outcome is generated by the game server, it is transmitted to the network manager which determines winning and losing bets.

In yet another embodiment, the gaming machine is capable of providing the player the option to play more than one game of chance. For example, while playing roulette, the player may also play Keno or craps. When playing more than one game of chance, the player may select one or more wagers to placed on the next to occur play in a first game, switch to a second game and select a second series of wagers before switching back to the first game to determine the results of the previous play of the first game of chance and the won/loss determination of the wagers place on the first game. All wagers are deducted from the player's stake and winnings added to the stake.

BRIEF DESCRIPTION OF THE DRAWINGS

FIG. 10 illustrates a preferred format of the protocol data units.

DETAILED DESCRIPTION OF THE INVENTION

Figure 1:
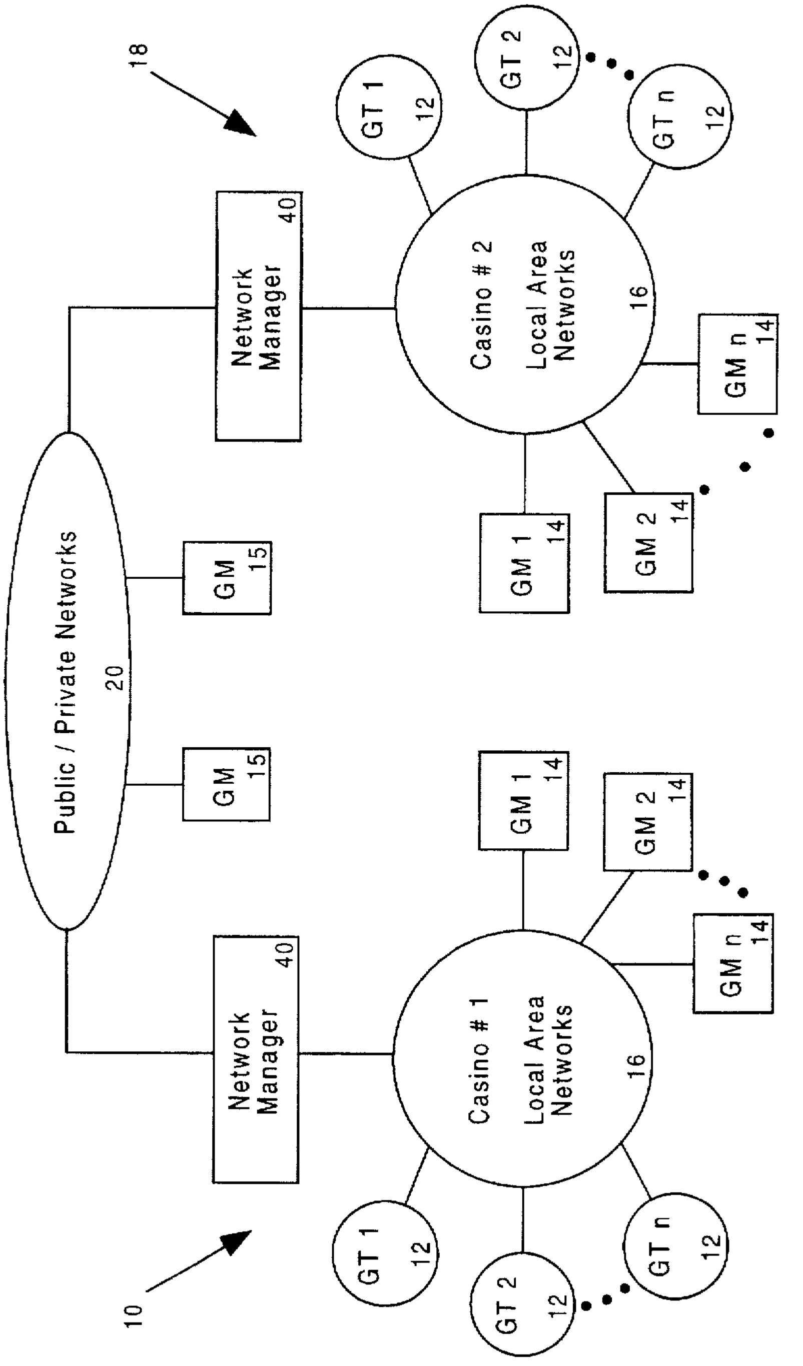
FIG. 1 is a schematic diagram of an interactive network gaming system.

Referring to the drawings more particularly by reference numbers, FIG. 1 shows a preferred embodiment of an interactive network system 10 of the present invention providing remote real-time interactive gambling. Interactive network system 10 comprises a first plurality of gaming tables 12 and a second plurality of gaming machines 14 coupled by a network system 16. In the preferred embodiment, casino board games, such as craps, roulette or baccarat, are conducted by a casino employee at gaming tables 12 within the confines of an established casino. Gaming machines 14 are electronic systems through which a player can, in real-time, play one of the board games at one of the gaming tables 12 from a remote location. Network system 16 comprises at least one computer means that performs network management functions and transmission means which are more particularly described below. In one preferred embodiment, gaming machines 14 and network system 16 are located in the premise of a casino substantially proximate to gaming tables 12 such as on a balcony above the casino gaming area where gaming tables 12 are located. In this manner a player using one of the gaming machines 14 has an expansive view of the gambling area while their gaming machine 14 provides a close-up view of the action at the selected one of gaming tables 12. Alternatively, gaming machines 14 are positioned in clusters adjacent to several gaming tables 12. In another preferred embodiment, gaming machines 15, a modified version of gaming machine 14, are located at a remote site outside of the casino.

The interactive network system 10 is expandable in a hieareheal manner. For example, interactive network system 10 may be coupled to a second interactive network system 18 by satellite, ISDN, telephone or cable transmission networks 20 for video and audio feeds and for digital communications. Network manager 40 provides the gateway to the second interactive network system 18. Digital communication transmissions between interactive networks 10 and 18 and between network manager 40, gaming table 12 and gaming machines 14 are preferably encrypted for security purposes using commercially available or proprietary encryption algorithms.

Any number of additional interactive network systems may be coupled to form a worldwide interactive network system. Alternatively, both interactive network system 10 and 18 may be located in a single casino so as to significantly increase the number of players that have access to any particular table. Thus, a popular one of gaming tables 12 may be coupled by interactive network system 10 to the plurality of gaming machines 14 as well as to the additional plurality of gaming machines 14 via interactive network system 18.

Gaming tables 12 may comprise a variety of games of chance such as roulette, carps, baccarat or other casino games. By way of examples, the game of craps may be conducted at some of the gaming tables 12 while baccarat and roulette may be conducted at still other tables. Each game of chance may be distinguishable from the other similar games of chance by the minimum wager amount, the gaming employee conducting the game and the participants or players sitting at or standing around the table.

The present invention increases the number of players at a single gaming tables since the interactive real-time network increases the number of players at any one gaming table 12 at any one time that can place a wager on one or more bets. No longer is the number of players limited due to space limitations since these players may use one of the remote gaming machines 14 and participate over network system 10 placing the same bets and result, as the players at the table. Due to the hierarchical nature of the interactive network system 10, a player at one of gaming machines 14 on network system 18 could also participate in the game at one of gaming tables 12 on network system 10. Thus, the number of players at any gaming table may significantly exceed the maximum number of players than could otherwise be positioned around a particular gaming table. Also, the casino's return per table has increased potential with respect to the amount of wagers placed per play at naming tables 12 because additional gaming employees are not required to operate or to attend to the many tasks required by the play of a particular game of chance even if there are a significant increase in the number of players.

In another preferred embodiment, a player or a group of players may desire to play an electronic game of chance where the results are randomly generated. For example, one gaming machine 14 may be designated as the game server. Instead of selecting one of gaming tables 12, any one of gaming machine 14 may be designated a game server for a plurality of gaming machines 14. In this mode the designated gaming machine 14 operates in a stand alone mode for one of a selected games of chance instead of selecting one of gaming tables 12 as a provider of the game. The game server internally generates the outcome of each play of the selected game. This mode is particularly useful if a player is attempting to learn the rules and strategies associated with the selected game and would like the opportunity to place wagers on their bet. If the game server is coupled by network 16 to additional gaming machines 14, the outcome is transmitted to these additional gaming machines. The results of various bets are determined by the network managers 40 or game machines 14 and winning wagers are paid while losing wagers are collected.

Figure 2:
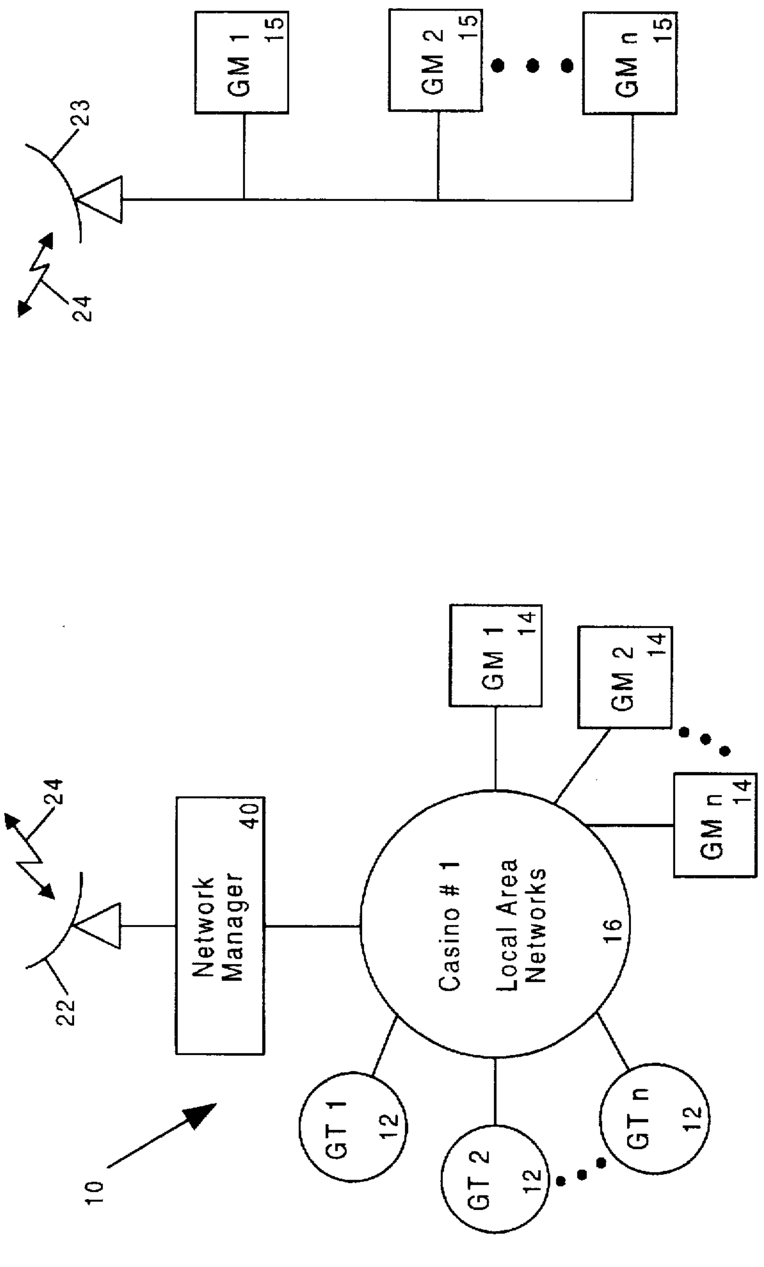
FIG. 2 is a schematic diagram of a hierarchical embodiment of the interactive network gaming system of the present invention.

In FIG. 2, a plurality of gaming machines 15 are coupled to a selected one of gaming tables 12 through network manager 40 by a VSAT transmission network. Primary station 22 and secondary station 23 establish communication links for the transmission of digital, video and audio information by satellite (not shown). Although only one secondary station 23 is shown, it is intended that the present invention may include many such stations so as to permit participation in a game of chance from several remote sites. Information transmission is indicated by bi-directional arrows 24. Access to network 40 and connection of gaming machines to gaming tables 12 is established through network manager 40. For security reasons, certain functions such as establishment of a player's stake and determination of a winning or losing bet are resident on network manager 40 rather than distributed at gaming machines 15. The embodiment shown in FIG. 2 is ideally suited for establishment of a remote casino annex in non-traditional locations such as airports, on airplanes, on cruise ships or in other locations outside of the traditional casino.

Figure 3:
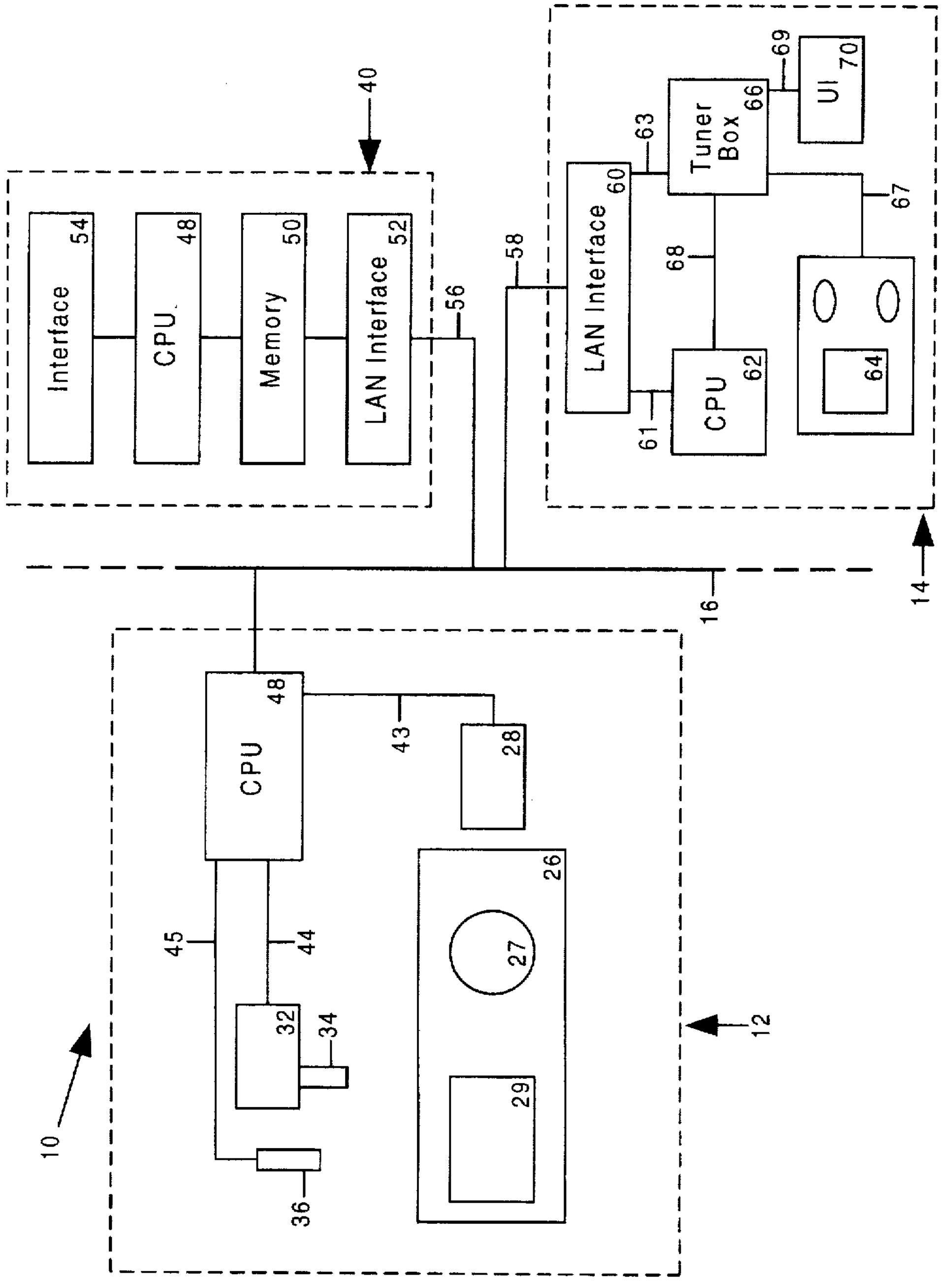
FIG. 3 is a block diagram of the interactive network system of the present invention shown in FIG. 1.

Referring now to FIG. 3, the interactive network system 10 of FIG. 1 is shown in greater detail. Gaming table 12 comprises a table 26, outcome detector 28, video camera 32 with lens 34 and microphone 36. Table 26 provides the playing surface including the bet board for one of the games of chance such as roulette, craps or baccarat or variations on these games. The combination of camera 32 and lens 34 provides real-time video and audio signals of the events on and around table 26 in a manner discussed in more detail below. The terms video, video feeds and video signals may be used interchangeably therein to denote signals representing, visual images for display on television, a computer display or such similar device. The terms audio, audio feeds and audio signals may be used interchangeably therein to denote signals relating to the transmission and reproduction of sound.

If the game of chance is roulette, a roulette wheel 27 and a roulette bet board 29 are positioned on the top surface of table 26. If the game of chance is craps or baccarat or some other game, the bet board for such game is positioned on table 26. It is to be understood that table 26 may provide the playing surface for any number of games of chance and is not to be limited by the illustrative examples herein.

Outcome detector 28 is preferably an infrared detector and tachometer if the game of chance is roulette. In this instance, the roulette wheel includes a means for generating a tach pulse. The tach pulse corresponds to one of the 38 different numbers on an American style roulette wheel. The infrared detector detects the position of the roulette ball relative to the tach pulse from which the outcome detector is able to calculate the number selected by the roulette ball (not shown) as the roulette wheel stops spinning. The detected output is transmitted through coupler 30 and fiber optic cable 38 to network system 16.

In an alternative embodiment, outcome detector 28 is replaced by vision recognition software. In this embodiment, camera 32 is provided with lens 34 preferably a wide angle lens such that the field of view comprises the entire surface of table 26 with the ability to zoom in on the roulette wheel once all the wagers are placed and play has commenced. Once each play of the game of chance is complete, network manager 40 captures the image of the roulette wheel from the video feed to detect the location of the roulette ball and to thereby determine the winning number.

In yet another alternative embodiment, outcome detector 28 is a manual interface device on which the results are recorded by the gaming employee. In this embodiment, visual confirmation is provided to all players by the video output of camera 32. Use of such a manual interface device as an outcome detector 28 may be preferable when the game of chance does not lend itself to consistent placement of the result such as in craps where the dice may land anywhere on table 26 or in a card game where random placement of the cards may increase the time required to detect the outcome using visual recognition software.

Microphone 36 generates real time audio feeds that are transmitted over network 16 since the background noise in a casino is considered by some players as contributing to the excitement of gambling. However, the primary purpose of microphone 36 is to detect the speech output of the gaming employee so that remote players have audible indications that a new play of the game of chance will soon begin as well as audio confirmation of the winning bet. Accordingly, microphone 36 is either a directional microphone mounted proximate to the gaming employee or is of the type that can be attached to the gaming employee's clothing which uses radio-frequency (RF) means to transmit its signal onto network 16.

Gaming table 12 further comprises an intelligent coupler 42 that interfaces the various elements of gaming table 12 with network 16. Outcome detector 28 is connected to coupler 42 by cable 43. Video camera 32 is connected to coupler 42 by video cable 44 and microphone 36 is coupled by cable 45 to coupler 42. Cables 43, 44 and 45 may be replaced by Infrared or radio transmission communication links. Cable 46 connects coupler 42 to network 16. Cable 46 is preferably a fiber optic cable or alternatively a shielded coaxial or paired cable capable of high speed simultaneous transmission of digital communications, audio and video signals. Coupler 42 may be a passive coupling device but in the preferred embodiment, coupler 42 comprises a microprocessor adapted to detect and transmit an assortment of information generated by the components of gaming table 12.

Network manager 40 comprises a computer 48, memory 50 (including primary, secondary and tertiary memory storage mediums) and a local area network interface 52. A second interface, interface 54, interfaces interactive network system 10 with transmission networks 20. Network manager 40 is responsible for controlling operation of network 16 and for providing system level resources to each of the gaming machines 14 connected to interactive network system 10. Specifically, when a player initiates a session on one of the game machines, network manager provides status information regarding the active game tables 12 and manages the login and logout activity at each game machine 14. Also, if a player desires to establish a stake by accessing their casino credit line, game machine 14 must obtain authorization to establish the stake and the maximum authorized amount from network manager 40. Account balances are maintained at network manager 40. Network manager 40 also tracks the current availability of active game tables as well as status information regarding each particular game of chance such as minimum wager amounts, table limits or game statistics (for example, number of players, average time required to complete each play of the game, etc.). This information is transmitted to each game machine 14 when a new player desires to initiate play or at other times upon the request of the player. Network manager 40 also establishes the connection with off-site game machines such as game machines 14 connected to network 18 or to game machines 15. Transmission of digital communications between network manager 40 and game machines 14 is via network 16.

Gaming machine 14 comprises a network interface 60 for receiving digital communications as well as audio and visual signals over network 16, a gaming CPU 62, a display and speaker system 64 and a tuner box 66. Digital information is routed to gaming CPU 62 by cable 61 while audio and video signals are routed to tuner box 66 by cable 63. Game machine 14 further comprises a user interface 70 (such as a keyboard/mouse combination or a touch screen control device) and an optional wager collection/return means 72. In one preferred embodiment, tuner box 66 is an audio and video adaptor that accepts video and audio signals from a standard local area networks (LANs) and provides a scaleable on-screen image on display and speaker system 64. One such tuner box 66 is available under the trademark PC/TV by Tecmar™ manufactured by Rexon Incorporated of Longmont Colo. Display and speaker system 64 is connected to tuner box 66 by a cable 67. Gaming CPU 62 and user interface 70 interface with display 66 through tuner box 66 via cables 68 and 69, respectively. Gaming machines 15 are identical to gaming machines 14 except that user interface 70 does not include wager collection/return means 72. Also, gaming machines 15 connect to network 16 through network manager 40 rather than directly to minimize the communications that must be transmitted over networks 20.

Figure 4:
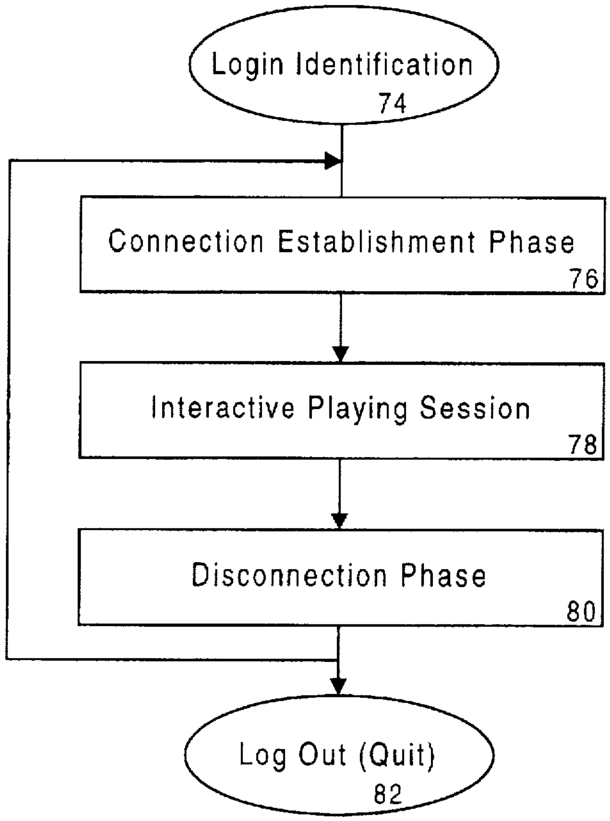
FIG. 4 is a functional block diagram of general communication protocol phases.

FIG. 4 is a functional block diagram of general protocol phases for communicating between gaming machines 14 and gaming table 12 or another gaming machine 14 which is configured to operate as the game server (that is, the source of the outcome of each play of the selected game of chance). The initial phase is the login phase 74 during which a player must enter certain identifying information such as the player's name and password or other authenticating information. The network manager 40 must authenticate the player and determine the specific game of chance the player wishes to participate in. The authentication routine will depend on whether the player is local, that is within the casino premises or remote, whether the player will establish a stake by credit or currency via wager collection means 72 (see FIG. 3) or whether the selected game is a high stakes or high risk game. In a more exacting authentication routine will be performed if the player chooses a high stakes game or a game where substantial sums could be quickly lost such as in baccarat. Typically, such authentication routines will be proprietary for each casino.

The second phase is the connection phase 76 during which the user must select from a menu of available gaming tables 12 or gaming machines 14, currently available to act as a game server. At this time network manager 40 establishes the player's stake by either accepting currency via wager collection/return means 72 (FIG. 3) or opening a credit account. Network manager 40 also establishes the minimum wagers that will be accepted for the selected game.

Interactive playing phase 78 is the third phase. During interactive playing phase 78, gaming machine 114 receives video and audio information over video link 58 and transmits such information to display and speaker system 64. Gaming machine 14 also receives digital communications from network manager 40 advising gaming machine whether replaced by the player is accepted at the network manager. If accepted, the wager will either be a winner or a loser or a draw on the next play of the particular game of chance. If not accepted, the wager will be posted to the bet board for next subsequent play. This information will be displayed on the display and speaker system 64 to advise the player.

The disconnect phase 80 is generally initiated by the player but may be initiated by the network manager 40 in response to apparent security violations or technical difficulties. During the disconnect phase, network manager 40 transmits any winnings payable to the player if the player was using the wager collection/return means 72 to deposit currency wagers or prints a receipt of winnings, posted to the players credit account which the player may collect at a later time. Upon completion of disconnection phase 80, the link between gaming machine 14 and network manager 40 is disconnected and the player is logged out from the interactive network system 10.

Figure 5A:
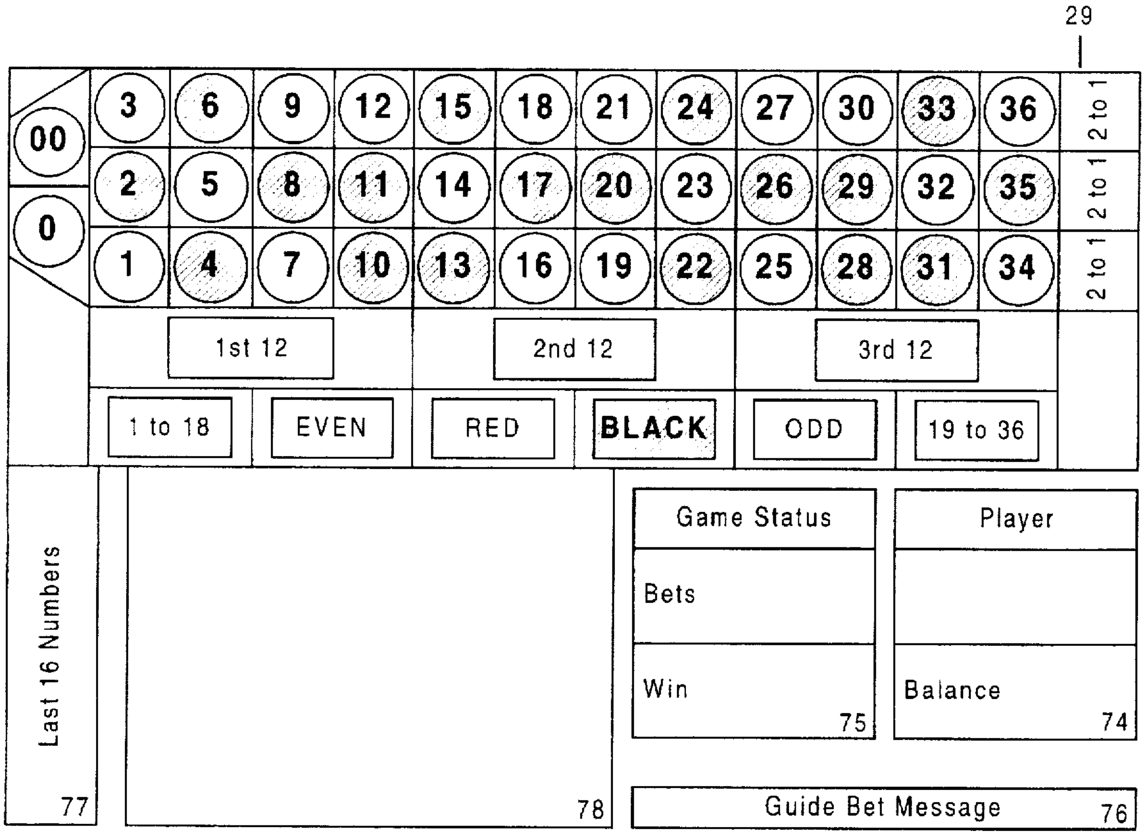
FIGS. 5A and 5B are illustrative representations of a game chance as displayed on a gaming machine's display.
Figure 5B:
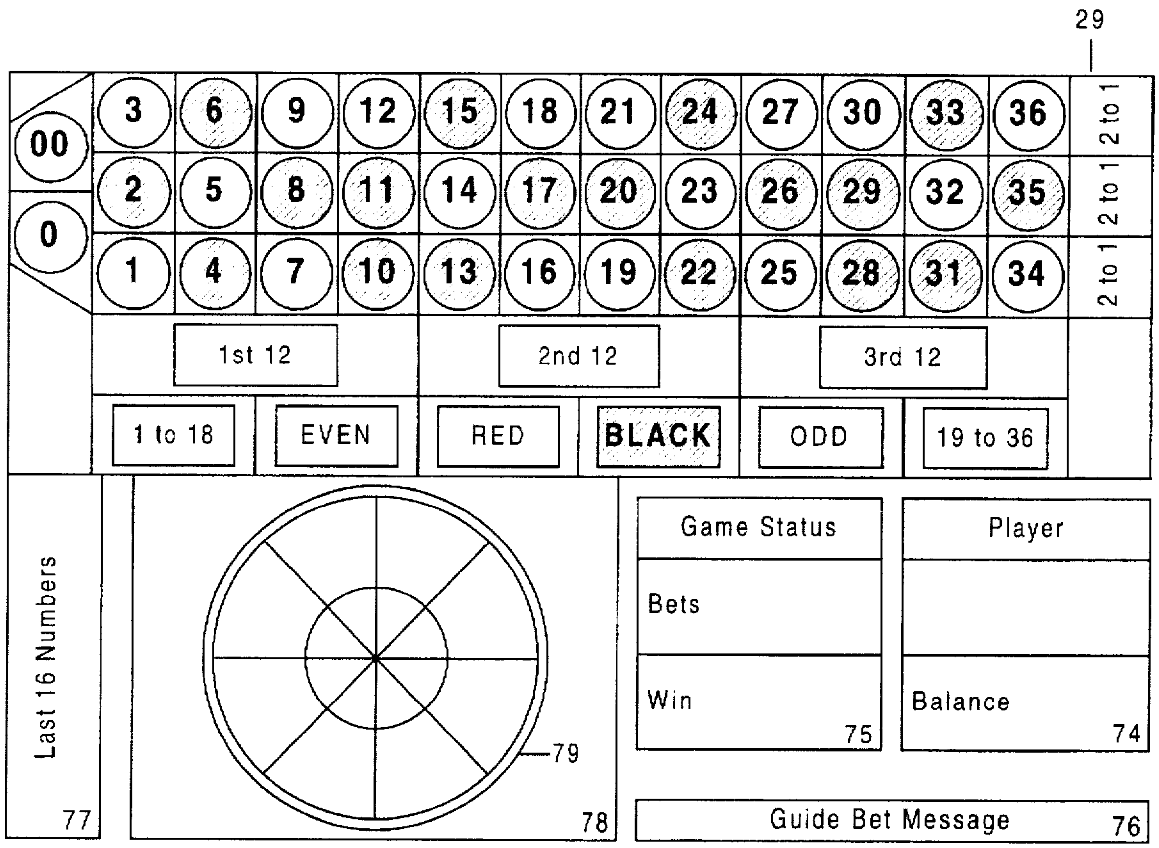

FIGS. 5A and 5B are illustrative representations of a game chance as displayed on the display screen of display and speaker system 64. In FIG. 5A, a computer generated image representation of bet board 29 is shown. It will be understood by one of ordinary skill in the art that different bet boards will be displayed if a game other than roulette is selected by the player. Bet board 29 is a reproduction of the bet board at the selected one of gaming tables 12 and provides the player at one of gaming machines 14 the same bet selections. On the display screen of display and speaker system 64, a player window 74 presents player identification and a running summary of the amount of the stake available for wagering for the benefit of the player. As the player places bets, video markers or indicators are positioned on bet board 29. A summary of the bets and wager amounts is provided in the bet summary window 75 together with a summary or winning bets which appears after each play of the game. A message window 76 provides real-time messages of interest to the player. These messages may include guides on how to place a particular bet or other information the casino may wish to disseminate. Window 77 displays a history log of previous winning bets. In one preferred embodiment, the last 16 winning numbers are displayed.

In addition to bet board 29 and windows 74–77, the display screen of display and speaker system 64 also includes a video window 78. Video window 78 comprises a portion of the display screen wherein the player at a particular one of game machines 14 is provided a video view of the selected game table 12. Specifically, the video feed generated by video camera 32 is distributed on network system 16 and is obtained by tuner box 66 for display in video window 78. Concurrently, the audio feed is also obtained and reproduced from the speaker portion of display and speaker system 64 so that the player will have both visual and aural sensory input from the selected table. In other embodiments, video window 78 may be subdivided using picture-in-picture (PIP) technology so that more than one view of the table or more than one table are simultaneously provided to the player.

Using user interface 70, the player may enter one or more desired bets and wager amounts. In a sequential manner, the player moves one or more visual representations of casino chips onto the selected bet. These bets are summarized in summary window 75. To provide a degree of realism, the speaker and display system 64 generates the sound of a stack between two or four casino chips being dropped from a short height onto a felt cloth bet board as each wager is placed on the selected bet. As each wager is entered, the amount of the player's stake is reduced by a corresponding amount and the current value of the stake is displayed in player window 74. As will be appreciated by one skilled in the art, confirmation of the result of each play or the game of chance is visually and aurally provided by display and speaker system 64 while outcome detector 28 generates a digital representation of the result which is displayed in summary window 75.

If a player decides to use one of gaming machines 14 as a game server, video window 78 displays a computer generated representation depicting the result of each play. By way of example, a representation of a roulette wheel 27 is displayed if the selected game of chance is roulette. The displayed image 79 is generated by CPU 62 and positioned in video window 78 as shown in FIG. 5B. CPU 62 rotates displayed image 79 and generates the appropriate sound associated with the rotation and the movement of the roulette ball. It is important that the sound is synchronlizcd with the apparent rate of rotation of displayed image 79 to provide the player with the visual and aural sensation that a live action roulette wheel is being displayed. While the display screen of display and speaker system 64 displays the computer generated animated displayed image of the wheel 79 in video window 78, a random number is generated by CPU 62 using a random number generator to select the "winning" number. CPU 62 then positions the roulette ball over the winning number and stops the rotation of the displayed image on display and speaker system 64.

The animated displayed image involves four object modules. First, a random number generator generates an outcome between 0 and 37 where 37 represents the 00 bet on the bet board. In the preferred embodiment, the seed for the random number generator is the time and date although other seeds may be selected. The randomly generated number becomes the "winning" number for the current play of the game.

Second, animated wheel, consisting of at least four frames per rotation is generated and displayed in video window 78. Preferably, the wheel comprises four frames. In the first frame, wheel 79 is oriented at 0°; in the second frame, the wheel is oriented at 315°; in the third frame, wheel 79 is oriented at 270; and in the fourth frame, wheel 79 is oriented at 225°. The visual effect is that of a wheel rotating. Due to the speed of rotation, individual numbers need not be displayed. The rate of rotation decreases over time from an initial rate to a final rate of zero revolutions.

In the preferred embodiment, a pre-recorded coordinate table is provided in memory of game machine 14 identifying all 38 possible positions for the ball to stop after rotation of wheel 79. Since the wheel is referenced to a fixed reference point, the final position of each possible winning number is known before the visual representation is generated and a target angle, relative to the fixed reference point, will also be known. As is apparent to one skilled in the art, additional frame rotation sequences may be provided to enhance the visual effect and to more closely approximate a live action roulette wheel. It is also possible that the frame of reference in which the four frames are displayed could also be rotated such that the appearance is that the wheel 79 stops in random orientation.

Third, a roulette ball (not shown) starts at a predefined position on the wheel, preferably at 0°, and substantially rotates in an opposite direction from wheel 79. Each position of the roulette ball is calculated using the inner and outer radius of wheel 79 with the general trigonometric formulae:

newx=lastx+cos ((rot_angle*3.14159/180) * radius); 1)

newy=lasty+sin ((rot_angle*3.14159/180) * radius); 2)

Before the wheel starts to rotate, the lastx and lasty terms in Equations 1) and 2) are initialized with the current position of the roulette ball and the value of rot_angle, which represents the angular displacement of the roulette ball, is initially set at 15 degrees. Initially, the radius term is set to a value that corresponds to the radius of the outer circle defining wheel 79.

As the ball and the wheel start to rotate, each position of the ball is sequentially calculated so that the lastx and lasty terms always refer to the current x-y screen coordinates of the roulette ball and the newx and newy terms refer to the next, or target, x-y screen coordinates. At some point, the rotation of wheel 79 begins to slow and the ball begins to spiral toward the center of wheel 79. During this period, the rot_angle preferably remains at 15 degrees but the radius term is decremented, in increments of two, from the radius of the outer circle to a value corresponding to the radius of the inner circle. In the preferred embodiment, the outer radius has a value of 86 pixels and the inner radius has a value of 44 pixels. Thus, it takes 21 steps to spiral the ball down to the inner circle portion of wheel 79.

Once the ball has reached the inner circle and the radius term has a value corresponding to the inner radius, the ball must eventually align with the target number. Since the goal is to align the ball over the target number, the rot_angle term remains at 15 degrees until the ball is within ±60 degrees. Subsequently, a randomly chosen value for the rot_angle term is used such that movement of the ball is positioned to within ±15 degrees of the lastx and lasty screen coordinates and toward the target angle.

Fourth, and finally, the display and speaker systems 66 produces the customary sound of a ball spinning on a roulette wheel. The generated sound comprises at least four digitized sound patterns representing: the ball spinning at normal speed around the periphery of the wheel; the ball spiraling toward the center of the wheel; the ball hitting a knuckle and bouncing; and the ball dropping into the selected winning number slot approximately three seconds prior to the wheel reaching the final rate.

During operation of animated wheel, the ball and wheel 79 are at the null state with no animation. Wheel 79 is then ramped up to the initial rate within the first 16 frames (4 revolutions) and the ball ramps up within the first two frames. Accordingly, the animated wheel will further show the ball beginning with the third revolution. Upon achieving the initial rate, wheel 79 and the ball rotate for at least 10 revolutions in a second state. The sound during the second state comprises the spinning ball at the normal speed. In a third state, the initial rate of rotation of wheel 79 remains unchanged but the ball slows down by about 10% and begins to spiral toward the center of wheel 79. The sound during the third state corresponds to the ball spiral to the center. In a fourth state, the ball continues to rotate until it is within ±60 degrees of the winning number. At this time the ball begins to randomly jiggle toward the target for at least four revolutions of wheel 79 and the rotation rate of wheel 79 is decreased by 30%. On the third of the four revolutions the sound changes to that of the ball dropping into the target slot. In the final state, the sound is terminated, wheel 79 is displayed in its initial position with the ball in the slot corresponding to the winning number. The animation returns to the null state until the player has had the opportunity to select additional bets for the next play.

It should be apparent to one skilled in the art of computer animations that the displayed image 79 generated by CPU 62 could comprise a plurality of digitized video clips showing wheel 79 rotating and stopping in apparently random, but known, orientations with the ball superimposed over the target number.

Regardless of whether the embodiment discussed in conjunction with FIG. 5A or FIG. 5B is selected by the player, the display of bet board 29 and the placing bets by a player at one of the game machines 14 is independent from the video image being displayed in video window 78. Thus it is possible to place bets for one game of chance at one of gaming tables 12 while monitoring the activity at a different one of the gaming tables 12. Bets are represented by color coded graphical chips that may be placed on the desired bet by using a pointing device such as a trackball, selecting a chip in the desired amount and dragging the chip to bet position on bet board 29. In the preferred embodiment, bet board 29 as well as any representation of the chips, and player window 74, summary window 75, message window 76 and window 77 are arranged to fit within one screen display so that the animation in window 78 will not obscure the bet board.

Video window 78 is sized to correspond to the output of tuner box 66 and preferably comprises about twenty-five to fifty percent (25%–50%) of the display portion of display and speaker system 64 although the actual size may be determined by the player using user interface 70.

Figure 6:
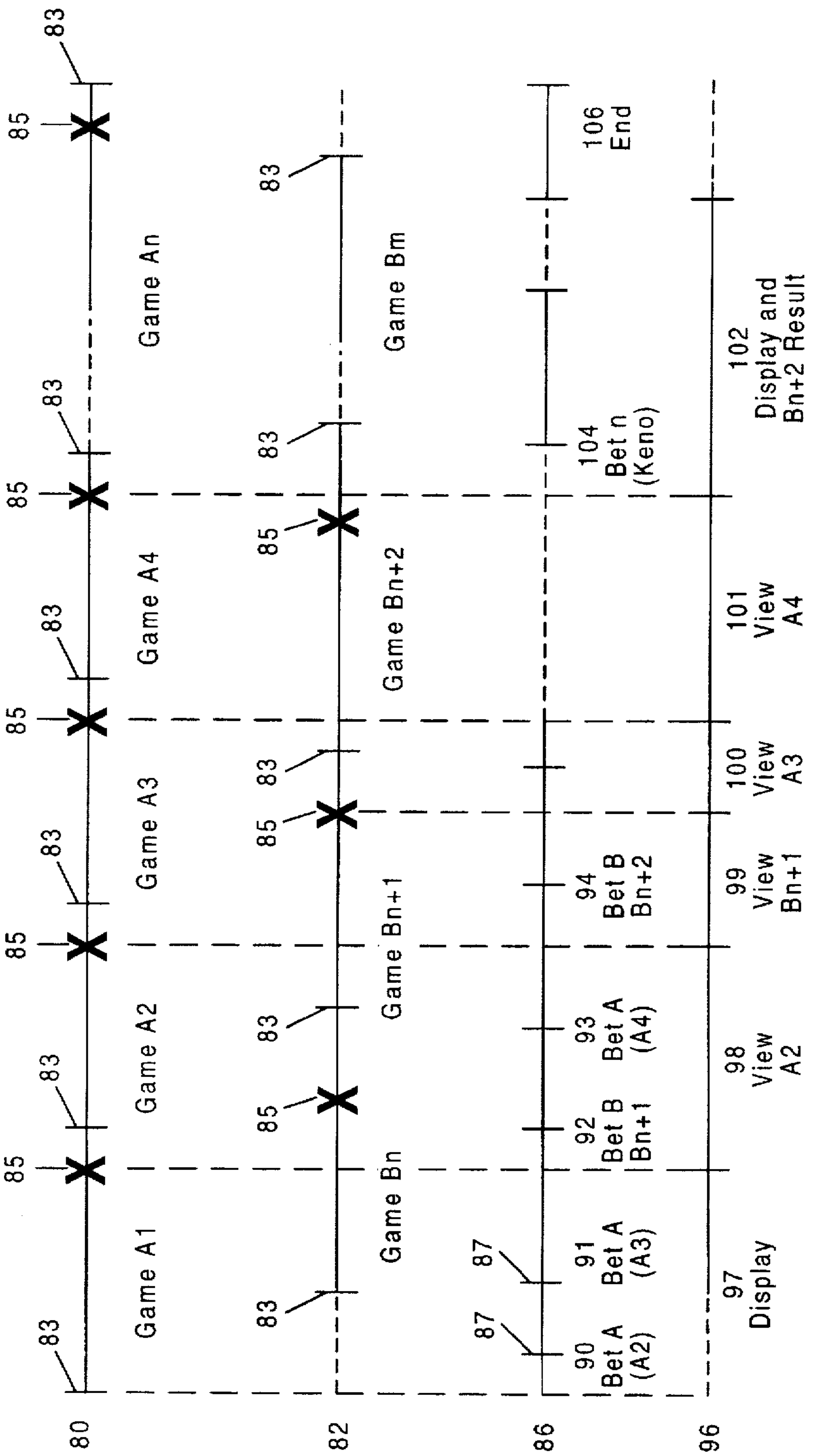
FIG. 6 is an illustrative representation showing the relationship of a sequence of plays of a game of chance and one betting sequence.

Referring now to FIG. 6, a timeline representation of a sequence of plays of two different games of chance, game A and game B, is shown. Also shown is an illustration of one possible betting pattern of a player at one of game machines 14 and the changing of the display presented in video window 78 on display and speaker system 64.

Timelines 80 and 82 represent the series of plays A1, A2, A3. . . An and Bn, Bn+1, . . . Bm for games A and game B, respectively. The start of each play of a game is indicated by start indicator 83. The time between the start of consecutive plays of a game depends on many factors such as the number of players at the table, the time allocated for placing the bets, the time it takes to conduct the game, and the time to collect losing wagers and to pay winning bets. Accordingly, it is anticipated that the time for each play of a game will vary about a typical nominal duration and that the nominal duration will further vary in accordance with the specific game of chance. At some time after the start of each play, the result will be detected by outcome detector 28 (see FIG. 3) and made available on interactive network system 16. The availability of the result for each play is indicated at the time designated at 85.

Timeline 86 represents one possible betting sequence for a player at game machine 86. In this illustrative example, the player designates the wager amount and one or more designated bets via user interface 70. Representation of each bet is displayed on display and speaker system 64 as each bet is placed. Once the player has placed all desired bets for a particular play, the results are entered as indicated at indicator 87 and game machine 14 prepares to accept additional bets for the next play of the same game or for a different game. As indicated by timeline 86, one or more bets 90 are first placed on game A. Bets 90 will be entered for game A2 because game A1 started prior to the entering of the bets. Similarly, the second group of bets 91 will be placed on game A3. If desired, the player may quickly change bet board to correspond to a different game, such as game B, and place a group of bets on the game of chance at a second of the gaming tables 12. In the illustrative example, bets 92 are placed on game B. Since bets 92 are not entered prior to the start of game Bn, bets 92 will be placed on game Bn+1. As shown in timeline 86, additional bets 93 and 94 are also placed on games A4 and Bn+2, respectively.

While the player is entering bets 90–91, display and speaker system 64 displays a general video feed, preferably of the general casino area as is shown in timeline 96 during period 97. However, once bet 90 has been entered, display and speaker system switches to display, in real-time, game A2 as it played at the selected one of the gaming tables 12. Thus, as indicated at time period 98 the player is able to see and hear the results in real-time just as if the player was physically present at gaming table 12. Once the result of game A2 is known, gaming machine 14 switches the display and speaker system 64 so that the player may view the play of game Bn+1 as is indicated at time period 99. In a like manner gaming machine 14 switches to affords view of games A2 and A4 during time periods 100 and 101. During time period 102 the display on display and speaker system 64 reverts to the general video feed since the play of game Bn+2 has already concluded. Since the results are known, the general video feed also includes a text summary of the results as well as any winning wagers.

As indicated at time period 104, a bet n may be placed on a game such as keno which is not associated with a gaming table. In this instance, the results of a keno game are transmitted via the network 16 and displayed for the player. The keno results will typically be displayed in conjunction with the general video feed. One skilled in the art will appreciate that the player at one of gaming machine 14 is provided the opportunity to rapidly place a series of wagers on a group of bets and that these bets can correspond to one, two or several different live action games of chance in real-time. When the player desires to terminate, the session may be ended as is indicated at time period 106.

Figure 7:
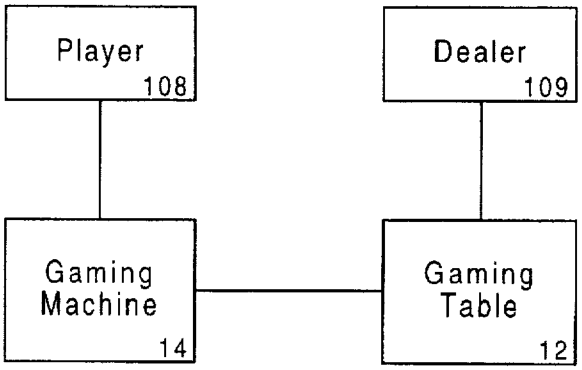
FIG. 7 is schematic block diagram of the protocol entities in one embodiment of the interactive network system of the present invention.

Referring now to FIG. 7, a schematic block diagram of the protocol entities in one embodiment of the interactive network system of the present invention is shown. In FIG. 7, a player is represented at 108 and the dealer is represented at 109. Player 108 and dealer 109 are physically remote from each other so the interface between them is determined by the communication system such as shown in FIGS. 1 and 2. The protocol defines the detailed communication between gaming machine 14 and gaming table 12 as defined in conjunction with FIGS. 8A, 8B and 9.

Figure 8A:
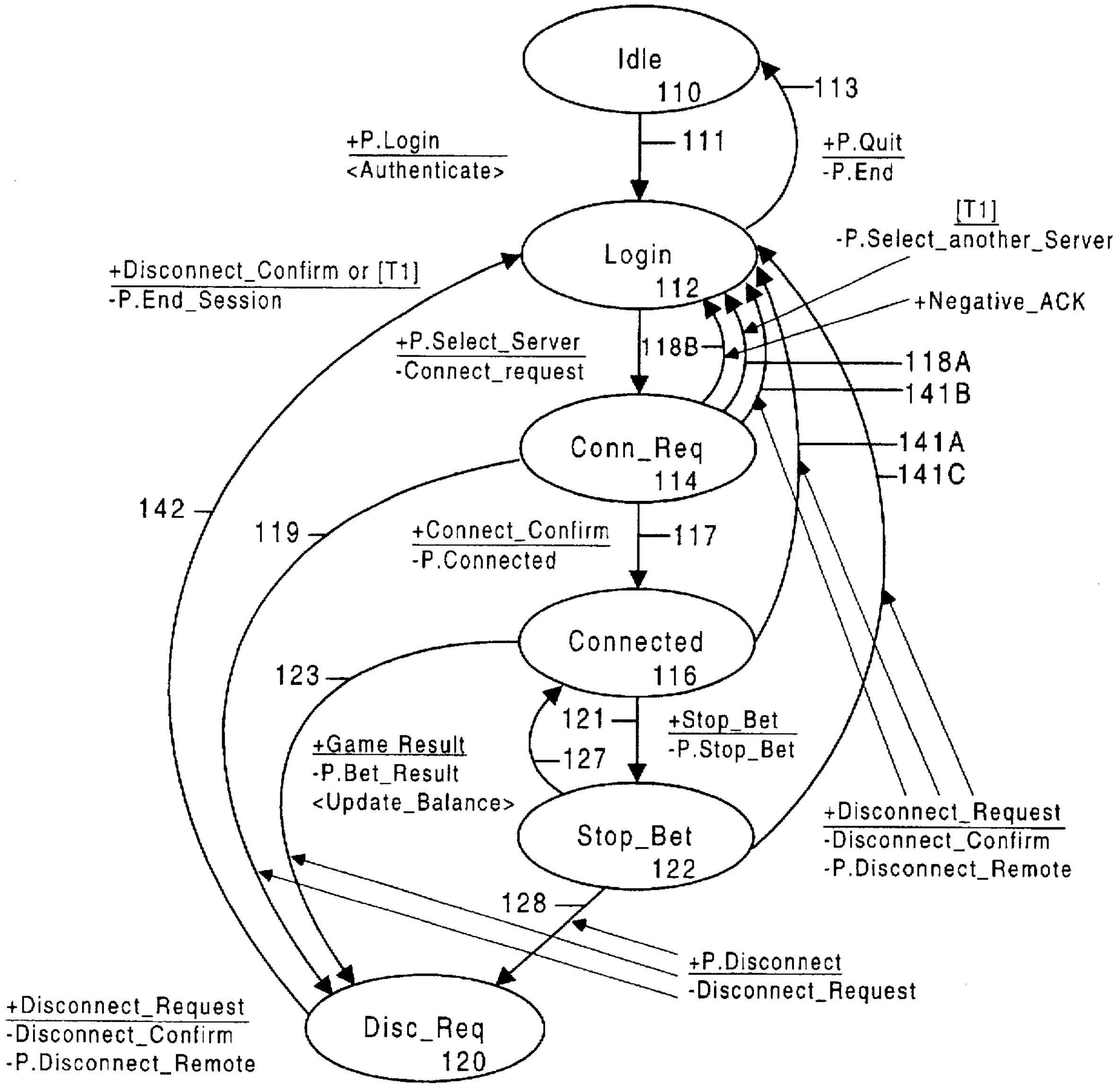
FIGS. 8A and 8B are finite state diagrams for gaming machines located in a secure and remote location, respectively.

FIG. 8A shows a finite state diagram for the remote gaming machine. Gaming machine 14 is in idle state 110 during the period of time when no players are using gaming machine 14. When a player wishes to use gaming machine 14, the player must initiate the login sequence. As indicated the player login ("+P.Login") is communicated to network manager 40 via digital communication link 56 (FIG. 3). Network manager 40 performs the authentication procedure ("<P.Authentication>"). If the authentication procedure is successful, gaming machine 14 enters login state 112 along path 111 and the player is provided a menu of options. The menu options (not shown) provide the user an opportunity to select one or a plurality of game servers from a list of available game servers or to exit interactive network system 10. If the player elects to terminate the session by electing the quit option ("+P.Quit"), gaming machine 14 returns to idle state 110 along patch 113. Network manager 40 responds to the termination request by terminating the player's session ("−P.End").

If the player selects at least one game server from the menu of options, the selected game server is identified ("+P.Select_Server") and the selected game server acknowledges the connect request. As soon as practical, the selected game server enters Connection Request state 114 and establishes the connection between the selected game server, that is for example, one of gaming tables 12 ("<−Connect_Request>"), and the requesting game machine 14. Once the connection attempt is successful, game machine 14 enters the Connected state 116 ("Connect_Confirm") along path 117.

While in Connection Request state 114, the player may be requested to select a different game server ("−P.Select_another_Server"), if a timeout occurs and game machine 14 returns to the login state 112 along path 118A. If the requested game server is not active, game machine 14 receives a negative acknowledgment ("+Negative_ACK") from the game server and return to the login state along path 118B. If the player requests disconnection, gaming machine 14 ceases the activity associated with the connection attempt and instead follows path 119 to the disconnection request ("Disc_Req") state 120.

Once the connection between gaming machine 14 and game server (which by way of example may be one of gaming tables 12) is established, gaming machine 14 enters connected state 116 and player 108 may participate in real-time interactive gambling. In this state, the results at the selected gaming table 12 determine whether any particular bet is a winning or a losing bet. Specifically, while in the connected state 116, the player may place wagers on any number of bets. At some time prior to the initiation of the next play of the game at gaming table 12, a stop bet request is communicated to gaming machine 14 along path 121. After the stop bet request is issued, gaming machine 14 enters the stop bet state 122 and the display of display and speaker system 64 provides a video and audio feed from the selected gaming table 12 ("−P.Stop_Bet"). After the play of the game concludes and a result is determined, the winning result is transmitted from gaming table 12 to gaming machine 14 via network manager 40. Microphone 36 (FIG. 3) detects the declared winning result as voiced by dealer 109 so that player 108 may audibly confirm the result. Gaming machine 14 compare the winning result with the bet or bets previously placed by player 108. Based on the comparison, the wager is either deducted from the players stake or the winnings are added thereto as indicated by path 127. At selected time periods, while in the connected state 116 or stop bet state 122, player 108 may issue a disconnect request and enter the disconnect request state 120 along paths 123 or 128. In state 120, game machine 14 performs accounting function, logs players 108 out and returns to login state 112 along path 129.

In the event of abnormal termination of a login session, control is transferred from connection request state 114, connected state 116 or stop bet state 122 to login state 112 along paths 141A, 141B or 141C, respectively. Abnormal termination may include, but is not limited to, loss of power, component failure or excessive noise in the communication network. Return to the login state 112 along paths 141A–141C indicate that an orderly termination of the login session did not occur.

Figure 8B:
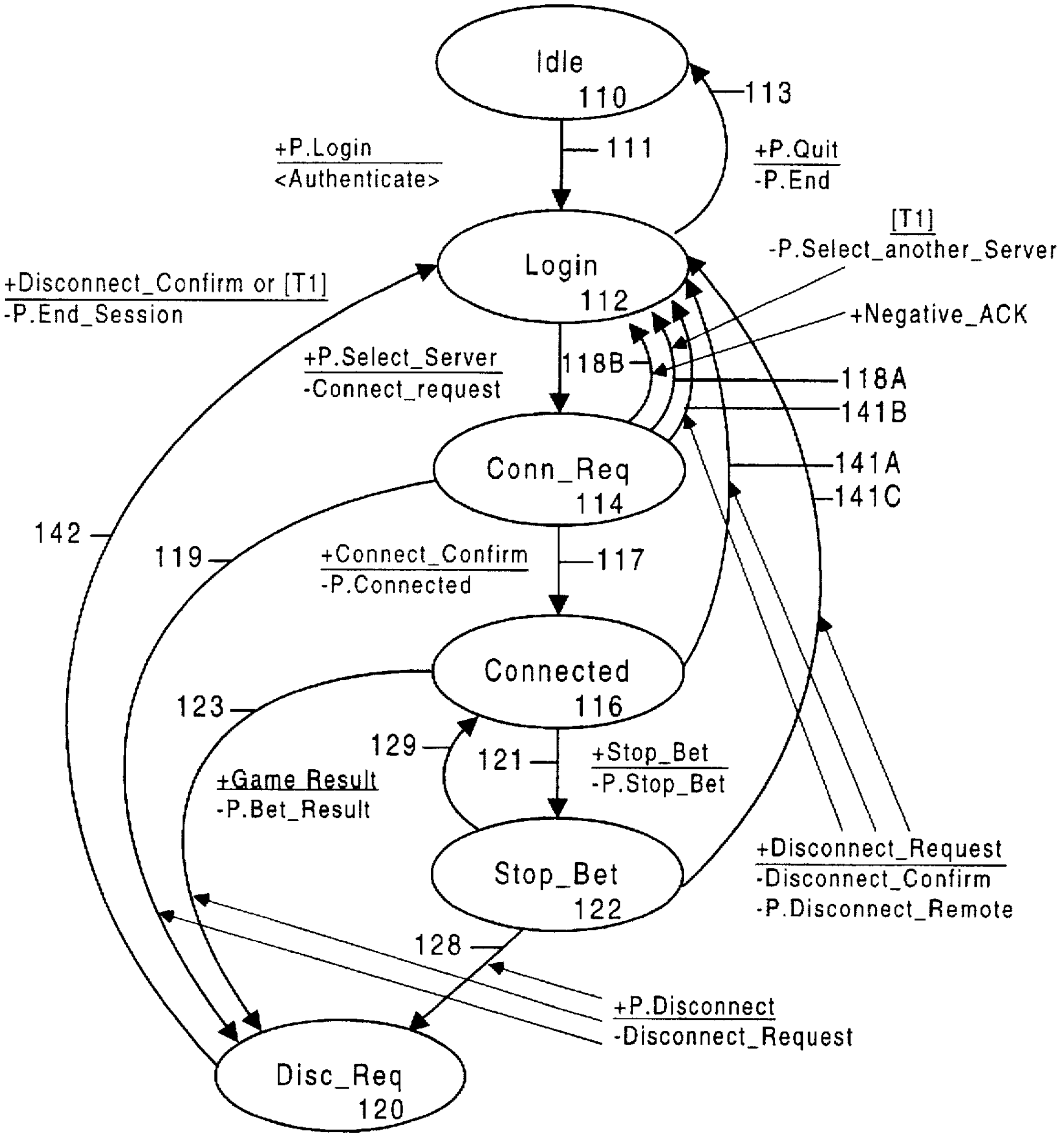

Referring now to FIG. 8B, the connection between gaming machine 15 and game server (again which by way of example may be one of gaming tables 12) is established in a manner similar to that described above. However, as shown in FIG. 2, network manager 40 handles the exchange of information regarding the selected bets placed at gaming machine 15 by player 108. Specifically, network manager routes the video, audio and digital data from network 16 to the appropriate game machine 15. Once gaming machine 15 enters connected state 116, the player 108 may participate in real-time interactive gambling by establishing the stake, which is maintained by network manager 40, and placing wagers on selected bets. Due to the remote nature of the location of gaming machine 15, the comparison of the winning result with the bet or bets previously placed by player 108 is made by network manager 40 as indicated by path 129. The determination of the network manager 40 is then transmitted to the remote gaming machine 15 for Presentation to the remote player 108. When the player wishes to disconnect, the remaining stake is credited to the players'account.

Figure 9:
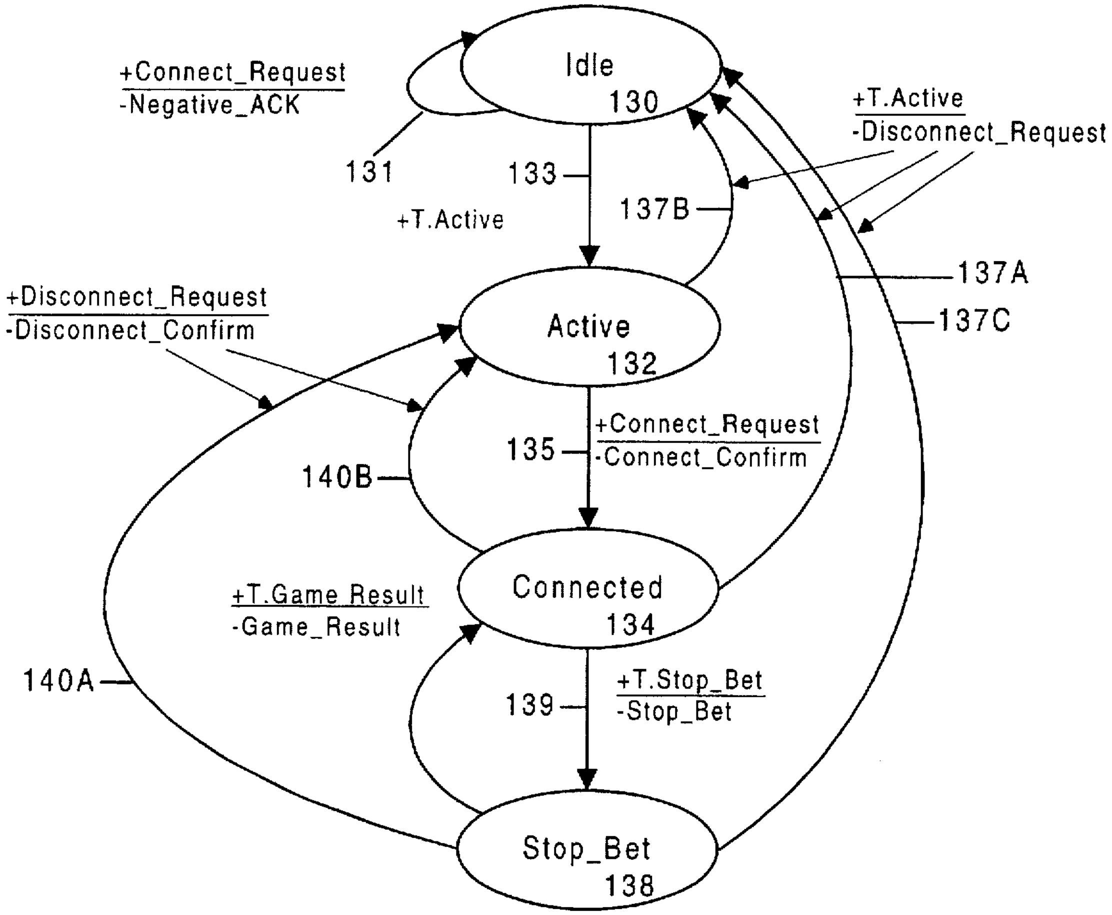
FIG. 9 is a finite state diagram for the network manager of the present invention.

Referring, now to FIG. 9, a finite state diagram for one of the game servers is shown. The game server may be either one of gaming tables 12 or, for example, one of gaming machines 14. The game server is initially in the idle state 130. After a player 108 logs in and selects a game server, the selected game server receives connect request ("+Connect_Request") as indicated at path 131 and issues a negative acknowledgment signal ("–Negative_Ack") if the game server is not active. If active, the game server enters the active state 132 along path 133. After the connection is established ("+Connect_Request" and "Connect_Confirm"), the game server enters the connected state 134 along path 135.

When the start of the next to occur game of chance is to begin, for example, such as when the roulette wheel is detected to be spinning ("+T.Stop_Bet"), a stop bet signal "Stop_Bet") is sent to each of the gaming machines 14 that have selected the game server via network 16 The game server enters the stop bet state 138 along path 139. At selected times, the player may initiate a disconnect request ("+Disconnect_Request") causing the game server to exit the stop bet state 138 or connected state 134 and return to the active state 132 along paths 140B and 140A, respectively. If, however, an abnormal condition occurs, such as a long period without a response from player 108 (timeout condition), control is immediately transferred to the idle state 130 along paths 137A–137C.

As will be appreciated by one skilled in the art, the above described interactive network system 10 contemplates the transmission of significant amounts of digital communications between the game server, the network manager 40 and the gaming machine 14 and as well as video and audio (both of which may also be digitized) information. Accordingly, an efficient format for data transmission is required. Referring now to FIG. 10, a preferred format of protocol data units is illustrated. The format comprises a start delimiter (SD) 150 and an end delimiter (ED) 164, a gaming machine identification number (CID) 152, a game server identification number (SID) 154, an identifier of the transmission type (TYPE) 156, a normally zero field reserved for transmission of various gaming information (TYPE PARAM) 158, an optional variable length field for video and audio data (DATA) 160 and a cyclic redundancy code block (CRC) 162.

In the preferred embodiment, SD 150 and ED 164 are identical and serve to act as a combination preamble and postamble for synchronizing the data stream with the receiving circuits such as network interface 60 (FIG. 3) thereby facilitating connection between the sender and the receiver. Both the SD 150 and the ED 164 are preferably one byte in length. CRC 162 is preferably a two byte block which is generated by the sender to enhance transmission reliability in a manner that is well in the art of digital communications.

CID 152 and SD 154 identify the gaming machine 14 and the game server (for example, gaming table 12), respectively, that generated the current frames of data units. This information, preferably two bytes in length, is used by interested receiving units to identify the whether the data unit should be acquired. For example, gaming table 12 needs to identify which gaming machine is transmitting a login request during the connection phase. Conversely, a gaming machine 14 that is waiting for the result from a specific one of the gaming tables 12 needs to identify the specific gaming table that generated the result.

The one byte TYPE 156 identifies the nature of the next to follow three or more bytes. Specifically, TYPE 156 identifies if the TYPE PARAM 158 relates to:

- a connect request from one or the gaming machines 14 or a confirmation of a connection;
- a disconnect request or a confirmation of the disconnection;
- a stop bet signal issued by the game server;
- identification of the game result for the just concluded game of chance, or
- general data for transferring optional video and audio information.

The data contained in TYPE PARAM 158 is typically set to zero except if the game server issues certain status information such as minimum or maximum betting limits; disconnection requests issued by the game server, or identification of the game result.

The protocol data units may be encrypted to prevent interception and improper modification by a third party. It should be appreciated that the above described format is for illustrative purposes only and that one skilled in the art may substitute or modify the above format with a proprietary format for security purposes.

While certain exemplary preferred embodiments have been described and shown in the accompanying drawings, it is to be understood that such embodiments are merely illustrative of and not restrictive on the broad invention. Further, it is to be understood that this invention shall not be limited to the specific construction and arrangements shown and described since various modifications or changes may occur to those of ordinary skill in the art without departing from the spirit and scope of the invention as claimed.

We claim:

1. A real-time interactive gaming system for enabling remotely located players to place wagers on one or more plays of at least one of a plurality of live-action games of chance, said gaming system comprising:

a plurality of game servers having means for generating a series of plays of at least one of said games of chance, each game server having means for generating video signals and audio signals of said series of plays;

a plurality of gaming machines each having means for displaying a bet board and for selectively displaying the video signals and broadcasting said audio signals corresponding to said video signals; each of said gaming machines having means for graphically placing wagers on said bet boards at a rate that is independent from the rate of play of said selected one of said games of chance.

2. The gaming system of claim 1 further comprising:

a network manager means for authenticating the player at each of said plurality of gaming machines, for creating a list of wagers placed at each of said gaming machines and for determining whether wagers are accepted relative to the next to occur play of said sequence of plays; and transmission means for transmitting said video signals and audio signals of each of said series of plays generated by said plurality of game servers to at least one of said plurality of gaming machines and for coupling said network manager to each of said plurality of gaming machines and to each game server.

3. The gaming system of claim 2 further comprising a second plurality of gaming machines each coupled to said network manager by a second transmission means; each of said second plurality of gaming machines capable of selecting at least one of said plurality of live-action games of chance, transmitting wagers corresponding to at least one bet on said selected game of chance to said network manager, and receiving from said network manager said video and audio feeds corresponding to the next to occur play of the selected game of chance; said network manager having means for determining winning and losing bets and means for crediting payoffs corresponding to winning wagers to a user account in response to said outcome detecting means; said network manager further having means for transmitting the result of each play of the selected game of chance to selected ones of said second plurality of gaming machines.

4. The gaming system of claim 2 further comprising means for detecting the outcome of each game of chance.

5. The gaming system of claim 2 wherein said outcome detector comprises manual means for detecting the outcome of said game of chance.

6. The gaming system of claim 2 wherein said network manager further comprises an outcome detector means for detecting the outcome of each game of chance at each of said game servers and means for determining winning and losing wagers placed at said gaming machines and for distributing payoffs corresponding to winning wagers in response to said outcome detector means.

7. A real-time interactive gaming system that permits a player to participate in a plurality of games of chance from a remote gaming location comprising:

a plurality of game servers for generating a series of plays of said games of chance;

detection means associated with each of said game servers for detecting an outcome of each play of the series of plays of the game of chance and for generating a video signal and an audio signal for the series of plays of the games of chance;

a game machine having user interface means for placing wagers prior to one of the series of plays of the games of chance at a independent rate relative to the rate of play generated by said game servers; said game machine having means for displaying a bet board related to each of said games of chance and for displaying the video signal of the games of chance; said game machine having means for determining winning and losing bets placed by the player based on the outcome of the selected play of the series of plays of the game of chance in response to said detection means;

transmission means for transferring said video and audio signals to said game machine and for transferring the outcome of each play of the series of plays of the games of chance detected by said detection means to said game machine.

8. The real-time interactive gaming system of claim 7 wherein said game server comprises a first game machine and wherein the video signal of the series of plays of the game of chance comprises a computer generated image of said game of chance representing a randomly generated outcome of said game of chance.

9. The real-time interactive gaming system of claim 8 wherein the game server comprises a first game machine coupled by said transmission means to at least one additional game machine.

10. A method whereby a player may participate in a one or more plays of at least one live-action game of chance from a gaming machine located at a remote location relative to the game of chance where the gaming machine is coupled to the game of chance by an interactive network, the method comprising the steps of:

providing a selection of games of chance on a display of the gaming machine;

selecting one of the games of chance;

establishing a stake for the player;

providing a display of available bets for the selected one of the games of chance on the gaming machine;

placing a wager on selected bets by the player at a rate independent from the rate of play of the selected game of chance;

generating and transmitting video signals of the games chance;

displaying the signals of the next to occur play of the selected game of chance and the bets placed by the player at the gaming machine;

detecting the outcome of the next to occur play of the selected one of the games of chance; and providing means for the player to collect the stake upon termination of the remote participation.

11. The method of claim 10 further comprising the steps of:

selecting additional games of chance;

providing a display of available bets for each of the additional games of chance on the game machine;

determining the wager placed on each bet at a rate independent from the rate of play of the selected game of chance;

selectively displaying the video signals of at least one of the additional games of chance and the bets placed by the player at the gaming machine;

detecting the outcome of the next to occur play of each of the additional games of chance;

determining the winning bets at each of said additional games of chance; and calculating a payout based on the amount of the wager corresponding to the detected outcome and adding the payout to the stake.

12. A method whereby a player may participate in a one or more plays of at least one live-action game of chance from a gaming machine located at a remote location relative to the game of chance where the gaming machine is coupled to the game of chance by an interactive network comprising the steps of:

initiating play at least one of a plurality of gaming machines;

performing an authorization routine which includes establishing a player stake;

providing a selection of games of chance on a display of said gaming machine;

selecting at least one game server on which a game of chance is being played and establishing connection between said at least one game server and said gaming machine;

providing a display of available bets for each game of chance being played on each of said selected at least one game server on the gaming machine;

placing a wager for selected bets at a rate independent from the rate of play of each of the selected at least one game servers prior to the initiation of a next to occur play of the game of chance;

detecting the outcome of the next to occur play;

comparing the outcome of the next to occur play with said selected bets at a network manager; and providing means for the player to collect the stake upon termination of participation by the player.

13. A real-time interactive gaming system for placing wagers on at least one play of a plurality of live-action games of chance, said gaming system comprising:

a plurality of game servers each generating a series of plays of a game of chance;

detection means associated with each of said game servers for detecting outcomes of each play of the game of chance;

a plurality of gaming machines, each capable of accepting wagers corresponding to at least one play of a sequence of plays of said selected games of chance, sad gaming machines adapted to accept said wagers at a rate that is independent from the rate of play at said selected game servers;

means for transmitting signals showing the play of the at least one play and for transmitting said detected outcomes of each play to selected ones of said gaming machines;

computing means, coupled to said game servers and to said plurality of gaming machines by said transmission means, for authenticating the player at each of said plurality of gaming machines, for creating a list of wagers placed by players at each of said gaming machines and for determining, in response to said designation generated by said gaming machine, whether wagers are accepted relative to the next to occur play and for terminating participation by each player at each gaming machine.

14. The gaming system of claim 13 further comprising a second plurality of gaming machines each coupled to said computing means by a second transmission means; each of said second plurality of gaming machines capable of selecting at least one of said plurality of live-action games of chance, transmitting wagers corresponding to at least one bet on said selected game of chance to said computing means, and receiving from said computing means said video and audio feeds corresponding to the next to occur play of the selected game of chance; said computing means having means for determining winning and losing bets and means for crediting payoffs corresponding to winning wagers to a user account in response to said outcome detecting means; said computing means further having means for transmitting the result of each play of the selected game of chance to selected ones of said second plurality of gaming machines.

15. The gaming system of claim 13 wherein said game server comprises computer means programmed to randomly generate results of a selected game of chance.

16. The gaming system of claim 15 wherein said game of chance is roulette and said computer means further comprises means for positioning a representation of a roulette ball with respect to a graphical representation of a roulette wheel.

* * * * *